United States Patent
Yokomizo

(10) Patent No.: US 9,031,445 B2
(45) Date of Patent: May 12, 2015

(54) POWER SAVING MODES IN AN IMAGE FORMING APPARATUS

(71) Applicant: Canon Kabushiki Kaisha, Tokyo (JP)

(72) Inventor: So Yokomizo, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/285,812

(22) Filed: May 23, 2014

(65) Prior Publication Data

US 2014/0355033 A1    Dec. 4, 2014

(30) Foreign Application Priority Data

Jun. 4, 2013 (JP) .................................. 2013-117791

(51) Int. Cl.
  *G03G 15/20* (2006.01)
  *H04N 1/00* (2006.01)
(52) U.S. Cl.
  CPC .................................. *H04N 1/00896* (2013.01)
(58) Field of Classification Search
  CPC .................................................. H04N 1/00896
  USPC ............................................................ 399/70
  See application file for complete search history.

(56) References Cited

U.S. PATENT DOCUMENTS 6,055,068 A * 4/2000 Abe et al. ...................... 358/468

FOREIGN PATENT DOCUMENTS

JP      2001201986 A      7/2001

* cited by examiner

*Primary Examiner* — Eric A Rust
(74) *Attorney, Agent, or Firm* — Rossi, Kimms & McDowell LLP

(57) ABSTRACT

An image forming apparatus that is capable of coping with both a high power saving effect and a quick response. A reading unit reads an image of an original. A printing unit prints out image data. A control unit controls units including the reading unit and the printing unit. A detection unit detects an original placed in the reading unit. A power control unit restores the control unit and the reading unit from a sleep state when the detection unit detects an original, and further restores the printing unit from the sleep state before receiving a job when a sheet of the same size as the original concerned is stored.

5 Claims, 3 Drawing Sheets

POWER SAVING MODES IN AN IMAGE FORMING APPARATUS

BACKGROUND OF THE INVENTION

1. Field of the Invention

The present invention relates to an image forming apparatus, a control method therefor, and a storage medium storing a control program therefor. Particularly, the present invention relates to a control method for power-saving of an image forming apparatus.

2. Description of the Related Art

An apparatus, such as a multifunctional peripheral (MFP), which is used in an office is required to save power at a high level, in recent years. Accordingly, a proposed MFP can reduce effective electric power by turning off power of devices that are not used in a standby mode in addition to controlling ON/OFF of the entire apparatus and using a power saving mode. For example, Japanese Laid-Open Patent Publication (Kokai) No. 2001-201986 (JP 2001-201986A) discloses a technique for saving power consumption of each device of an apparatus according to a function of a selected application by turning off power of a fixing device and a sheet feeding system during a facsimile receiving operation, and by turning off power of an operation panel and an image scanner device.

On the other hand, in order to obtain a high power saving effect in a MFP, it is possible to turn on power of respective devices, such as a printer device and a scanner device, individually. For example, it is possible to turn on power of the devices at the time when an original is placed on the scanner unit. However, the printer device is not necessarily operated, even if an original is placed on the scanner device. And therefore, if the power of the printer device turns on at the time when an original is placed on the scanner device, sufficient power saving effect will not be obtained. On the other hand, if the power of the printer device is turned on after determining that the printer device will be operated, warming-up of the printer device will take time, which gives an impression of bad response of the apparatus to a user.

SUMMARY OF THE INVENTION

The present invention provides an image forming apparatus, a control method therefor, and a storage medium storing a control program therefor, which are capable of coping with both a high power saving effect and a quick response.

Accordingly, a first aspect of the present invention provides an image forming apparatus comprising a reading unit configured to read an image of an original, a printing unit configured to print out image data, a control unit configured to control units including the reading unit and the printing unit, a detection unit configured to detect an original placed in the reading unit, and a power control unit configured to restore the control unit and the reading unit from a sleep state when the detection unit detects an original, and to further restore the printing unit from the sleep state before receiving a job when a sheet of the same size as the original concerned is stored.

Accordingly, a second aspect of the present invention provides an image forming apparatus comprising a reading unit configured to read an image of an original, a printing unit configured to print out image data, a control unit configured to control units including the reading unit and the printing unit, a detection unit configured to detect an original placed in the reading unit, and a power control unit configured to restore the control unit and the reading unit from a sleep state when the detection unit detects an original, and to further restore the printing unit from the sleep state before receiving a job when identification information added to the original concerned is analyzed and a workflow accompanied by a print operation is set in the identification information.

Accordingly, a third aspect of the present invention provides a control method for an image forming apparatus comprising a detection step of detecting an original placed in a reading unit that reads an image of the original, a first restoration step of restoring a control unit that controls other units and the reading unit from a sleep state when an original is detected in the detection step, a determination step of determining whether a sheet of the same size as the original concerned is stored, and a second restoration step of restoring a printing unit, which prints image data, from the sleep state before receiving a job when it is determined that a sheet of the same size as the original concerned is stored in the determination step.

Accordingly, a fourth aspect of the present invention provides a control method for an image forming apparatus comprising a detection step of detecting an original placed in a reading unit that reads an image of the original, a first restoration step of restoring a control unit that controls other units and the reading unit from a sleep state when an original is detected in the detection step, an analysis step of analyzing identification information added to the original concerned, and a second restoration step of restoring a printing unit, which prints image data, from the sleep state before receiving a job when it is determined that a workflow accompanied by a print operation is set in the identification information in the analysis step.

Accordingly, a fifth aspect of the present invention provides a non-transitory computer-readable storage medium storing a control program causing a computer to execute the control method according to the third aspect.

Accordingly, a sixth aspect of the present invention provides a non-transitory computer-readable storage medium storing a control program causing a computer to execute the control method according to the fourth aspect.

According to the present invention, since the power of the printer device will be restored from the sleep state depending on whether a sheet of the same size as an original is stored at the time when the original is detected, the power is not supplied to unnecessary devices, which can cope with both a high power saving effect and a quick response.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
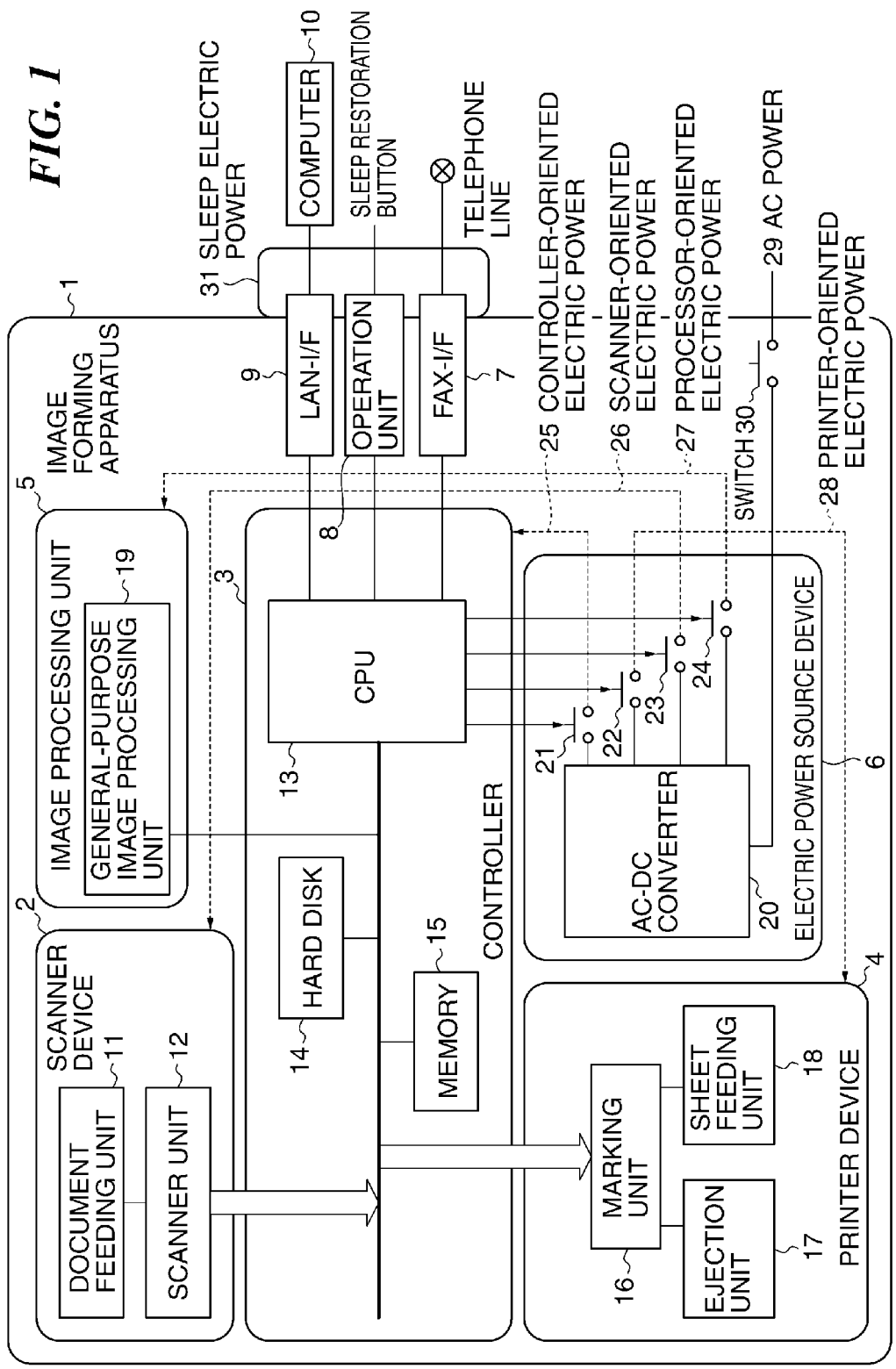
FIG. 1 is a block diagram schematically showing a configuration of an image forming apparatus according to a first embodiment of the present invention.

FIG. 1 is a block diagram schematically showing a configuration of an image forming apparatus according to a first embodiment of the present invention.

The image forming apparatus 1 is provided with the following devices.

A scanner device 2 is a reading unit that has a function for reading an image of an original optically, and converting the read image into a digital image. The scanner device 2 consists of a document feeding unit (DF unit) 11 that can feed originals one by one from an original bundle automatically, and a scanner unit 12 that can scan an original optically and can convert it into a digital image. The converted image data is transmitted to the controller 3.

A printer device 4 is a printing unit that has a function for printing a digital image on a paper medium. The printer device 4 consists of a sheet feeding unit 18 that can feed sheets one by one from a sheet bundle, a marking unit 16 that prints image data on a sheet fed, and an ejection unit 17 that ejects the printed sheet.

A controller 3 has a CPU 13, transmits and receives image data with the scanner device 2 and the printer device 4, and saves image data. For example, the controller 3 temporarily saves image data received from the scanner device 2 into a memory 15. Then, scan and save of an image are completed by storing image data into a hard disk 14. The hard disk 14 is a storage unit that stores digital images, control programs, etc.

Moreover, the controller 3 saves image data read from the hard disk 14 into the memory 15 temporarily, and can print an image by transmitting image data to the printer device 4 from the memory 15.

An image processing device 5 has a general-purpose image processing unit 19. The general-purpose image processing unit 19 can apply a reduction process etc. to image data saved in the memory 15, and can save the processed image data into the memory 15 again. This general-purpose image processing unit 19 is used in various scenes if needed.

A FAX_I/F 7 is an interface that connects with a telephone line etc., transmits a digital image as facsimile data according to an instruction from the CPU 13, and receives the facsimile data from the outside. An operation unit 8 is provided with various keys and buttons for operating the image forming apparatus 1, and a display unit that shows setting information and job information about the image forming apparatus to a user. Moreover, the operation unit 8 is provided with a sleep-restoration button for restoring the image forming apparatus 1 in a sleep state to a standby state.

A LAN_I/F 9 is an interface that connects with an external computer 10 through a network etc., and controls communication. The CPU 13 can input and output a digital image with the computer 10, can issue a job, and can give instructions to devices via a LAN. Moreover, the CPU 13 interprets operation instructions from the operation unit 8 and instruction information from the computer 10, and can execute various jobs.

An electric power source device 6 is provided with an AC-DC converter 20. The AC-DC converter 20 is connected to an external AC power 29 through a switch 30. When electric power is supplied to the AC-DC converter 20 from the AC power 29 by turning ON the switch 30, DC power will be generated by the AC-DC converter 20.

In the image forming apparatus 1, the CPU 13 can control the electric power of the entire apparatus while dividing the electric configuration of the apparatus into four independent components. Namely, the switch control from the CPU 13 enables to control OFF/ON of controller-oriented electric power 25. In the same manner, the switch control from the CPU 13 enables to control OFF/ON of printer-oriented electric power 28, scanner-oriented electric power 26, and processor-oriented electric power 27. The CPU 13 supplies electric power to necessary components of the image forming apparatus 1 appropriately by controlling switches 21, 22, 23, and 24 shown in FIG. 1. The switch 21 changes ON/OFF of the controller-oriented electric power 25 that is supplied from the AC-DC converter 20 to the controller 3. The switch 22 changes ON/OFF of the printer-oriented electric power 28 that is supplied from the AC-DC converter 20 to the printer device 4. The switch 23 changes ON/OFF of the scanner-oriented electric power 26 that is supplied from the AC-DC converter 20 to the scanner device 2. The switch 24 changes ON/OFF of the processor-oriented electric power 27 that is supplied from the AC-DC converter 20 to the image processing device 5.

The image forming apparatus 1 is provided with a copy function, an image transmitting function, an image saving function, an image printing function, a facsimile receiving-printing function, a facsimile transfer function, a facsimile memory receiving function, and a facsimile transmitting function.

The copy function saves an image read from the scanner device 2 into the hard disk 14, and prints it simultaneously using the printer device 4. The image transmitting function saves an image read from the scanner device 2 into the hard disk 14, and transmits it to the computer 10 via the LAN.

The image saving function saves an image read from the scanner device 2 into the hard disk 14. The image printing function analyzes PDL (page description language) data received from the computer 10, and prints it with the printer device 4.

The facsimile receiving-printing function saves a facsimile image received from the FAX_I/F 7 into the hard disk 14, and prints it simultaneously using the printer device 4. The facsimile transfer function saves a facsimile image received from the FAX_I/F 7 into the hard disk 14, and transmits it simultaneously to the computer 10 etc. via the LAN.

The facsimile memory receiving function saves a facsimile image received from the FAX_I/F 7 into the hard disk 14, and waits for a reference of an operator. The facsimile transmission function saves an image read from the scanner device 2 into the hard disk 14, and transmits it to the telephone line through the FAX_I/F 7 simultaneously.

The reason why saving data into the hard disk 14 in many cases is not to need re-scan of an image and re-reception of data even when a job fails and when the apparatus is recovered from an abnormal condition like power interruption.

The image forming apparatus 1 can shift to the sleep state in which power consumption is dropped as much as possible from the regular standby state. In the sleep state, the peripheral devices of the CPU 13 are made into a general suspend state (ACPI-S3 etc.), and electric power is supplied to a section that can detect a job (sleep electric power 31). Accordingly, the power consumption of the entire apparatus becomes extremely low. Specifically, the CPU 13 saves the state of the image forming apparatus 1 into the memory 15, and turns off the controller-oriented electric power 25. Although the CPU 13 itself stops the operation at this time, the sleep electric power 31 is turned on as a hardware action, which brings the apparatus to the state where only a reception of a job can be detected. For example, a network reception via the LAN_I/F 9, a facsimile call via the FAX_I/F 7, and an operation on the operation unit 8 turn on the controller-oriented electric power 25 as a hardware action.

The CPU 13 reads the state of the apparatus saved in the memory 15 from the memory 15, resets the saved state, restores the apparatus to a state just before the controller-oriented electric power 25 is turned off, and shifts to the standby state.

Since many hardware devices cannot operate in the sleep state, only the function to shift to the standby state is available. A job will be received after shifting to the standby state.

The controller-oriented electric power 25 is activated in the standby state. The CPU 13 can receive an operation by an operator on the operation unit 8 and a job from the computer 10 via the LAN in the standby state. Since the printer-oriented electric power 28, the scanner-oriented electric power 26, and the processor-oriented electric power 27 are not activated, the CPU 13 executes a specified job after activating switches for necessary devices among the switches 22 through 24. For example, a switch of each device is turned ON according to a job type as follows.

Copy function: Turning ON the scanner-oriented electric power 26 and the printer-oriented electric power 28, and achieving the copy function as mentioned above.

Image transmitting function: Turning ON only the scanner-oriented electric power 26, and transmitting the read image data.

Image saving function: Turning ON only the scanner-oriented electric power 26, and saving the read image data.

Image printing function: Turning ON only the printer-oriented electric power 28, and printing various image data.

Facsimile receiving-printing function: Turning ON the printer-oriented electric power 28 and the processor-oriented electric power 27, and printing the received facsimile image after applying the general-purpose image process.

Facsimile transfer function: Turning ON only the processor-oriented electric power 27, and transmitting the received facsimile data after applying the general-purpose image process.

Facsimile memory receiving function: Turning ON only the processor-oriented electric power 27, and saving the received facsimile data into the hard disk 14 after applying the general-purpose image process.

Facsimile transmitting function: Turning ON the scanner-oriented electric power 26 and the processor-oriented electric power 27, and transmitting the read facsimile image data to the public line.

When a job is completed, the power of the devices are turned OFF. This enables to activate only a necessary device when using, and enables to reduce the standby power consumption in the standby state.

Figure 2:
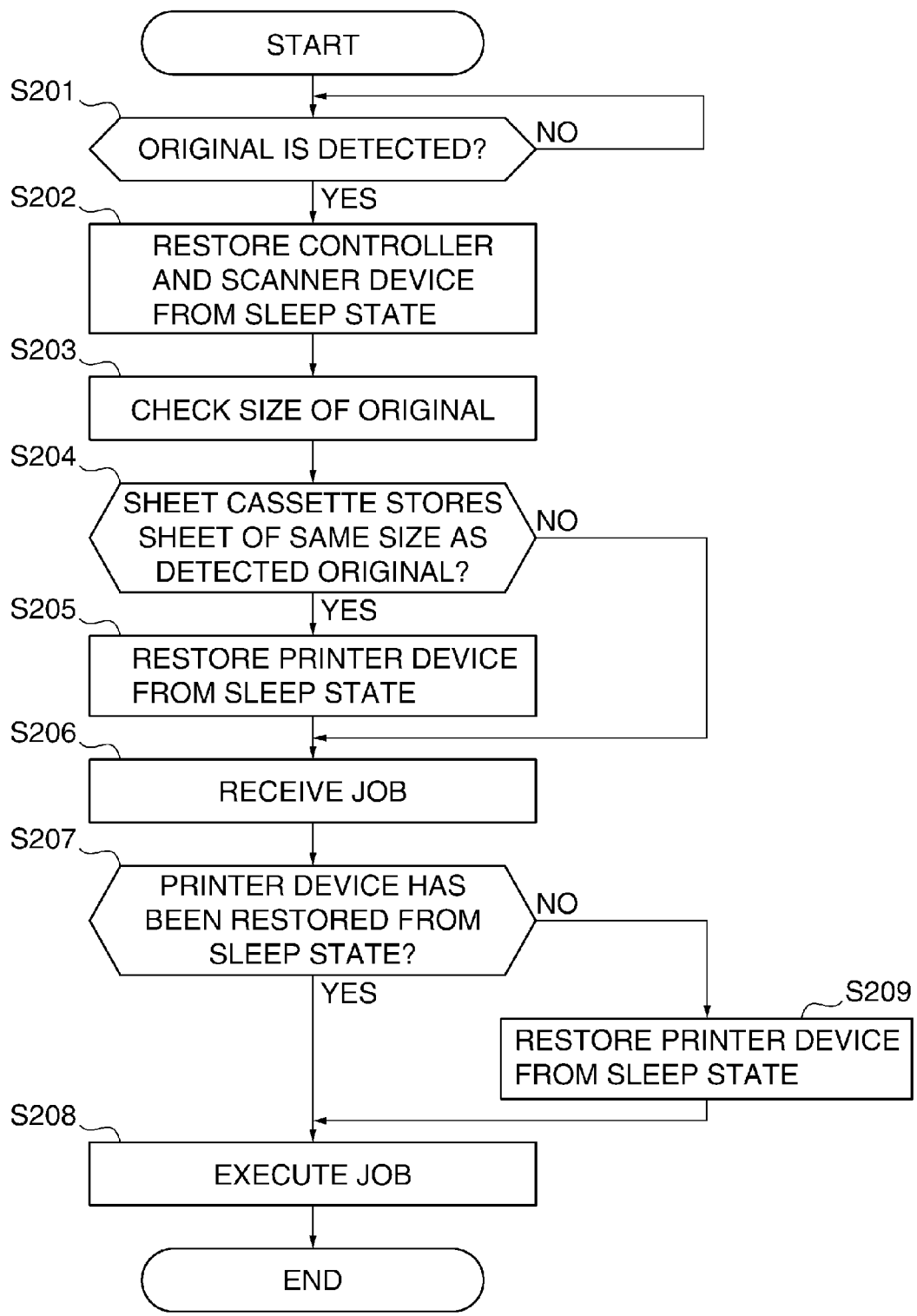
FIG. 2 is a flowchart showing a power control process of the image forming apparatus in the first embodiment of the present invention.

FIG. 2 is a flowchart showing a power control process of the image forming apparatus 1 in the first embodiment of the present invention. This process is achieved because the CPU 13 reads a control program from the hard disk 14 and executes the control program. Moreover, the image forming apparatus 1 shall be in the sleep state at the starting time of this process. Furthermore, a job received in this process shall need the printer device 4.

When the scanner device 2 detects an original (YES in the step S201), the CPU 13 receives an original detection signal transmitted from the scanner device 2, and performs a sleep restoration process for the controller 3 and the scanner device 2 (step S202). Although the sleep restoration process is performed when receiving the original detection signal from the scanner device 2 in this embodiment, the sleep restoration process may be performed in response to a depression of the sleep restoration button of the operation unit 8.

Next, the CPU 13 communicates with the scanner device 2, and checks the size of the detected original (step S203). Then, the CPU 13 determines whether a sheet cassette (not shown) in the image forming apparatus 1 stores a sheet of the same size as the detected original (step S204). When there are two or more sheet cassettes, the determination in the step S204 is performed for every sheet cassette.

When determining that the sheet cassette stores a sheet of the same size as the detected original (YES in the step S204) based on the determination result of the step S204, the CPU 13 executes the sleep restoration process for the printer device 4 (step S205), and proceeds with the process to step S206. On the other hand, when determining that the sheet cassette does not store the sheet of the same size as the detected original (NO in the step S204), the CPU 13 proceeds with the process to the step S206 without executing the sleep restoration process for the printer device 4.

In the step S206, the CPU 13 receives an operation by an operator on the operation unit 8 or a job from the computer 10 via the LAN. Since the printer device 4 is needed to execute the received job, the CPU 13 determines whether the printer device 4 has been restored from the sleep state (step S207). When determining that the printer device 4 has not been restored from the sleep state, the CPU 13 executes the sleep restoration process for the printer unit 4 (step S209) and then, executes the received job (step S208). On the other hand, when determining that the printer device 4 has been restored from the sleep state, the CPU 13 proceeds with the process to the step S208 without executing the step S209.

In the above-mentioned embodiment, when an original is detected, the controller 3 and the scanner unit 2 are restored from the sleep state. Moreover, when a sheet of the same size as the original concerned is stored, the printer device 4 is also restored from the sleep state before receiving a job. This enables a quick response to a job when the received job needs the printer device 4. On the other hand, when a sheet of the same size as the original is not stored, the printer device 4 is restored from the sleep state after receiving a job. This shortens the power-on time of the printer device 4, and improves a power saving effect. It should be noted that the above process is premised on a unity magnification copy that is the most frequently in jobs. That is, when a sheet of the same size as an original is stored, the printer device 4 is restored from the sleep state before receiving a job to obtain a quick response so as to execute a unity magnification copy job just after receiving the job. On the other hand, when a sheet of the same size as an original is not stored, a unity magnification copy job cannot be performed unless exchanging the stored sheet after receiving the job. Accordingly, since it is enough to restore the printer device 4 from the sleep state during the exchanging operation, the power saving effect is obtained by delaying the timing at which the printer device is restored from the sleep state.

Next, a second embodiment of the present invention will be described. The second embodiment is different from the above-mentioned first embodiment in that it is determined whether the sleep restoration process for the printer device 4 is performed based on identification information added to an original rather than the size of an original. The descriptions about the parts identical to that in the above-mentioned first embodiment are omitted, and only different points will be described.

Figure 3:
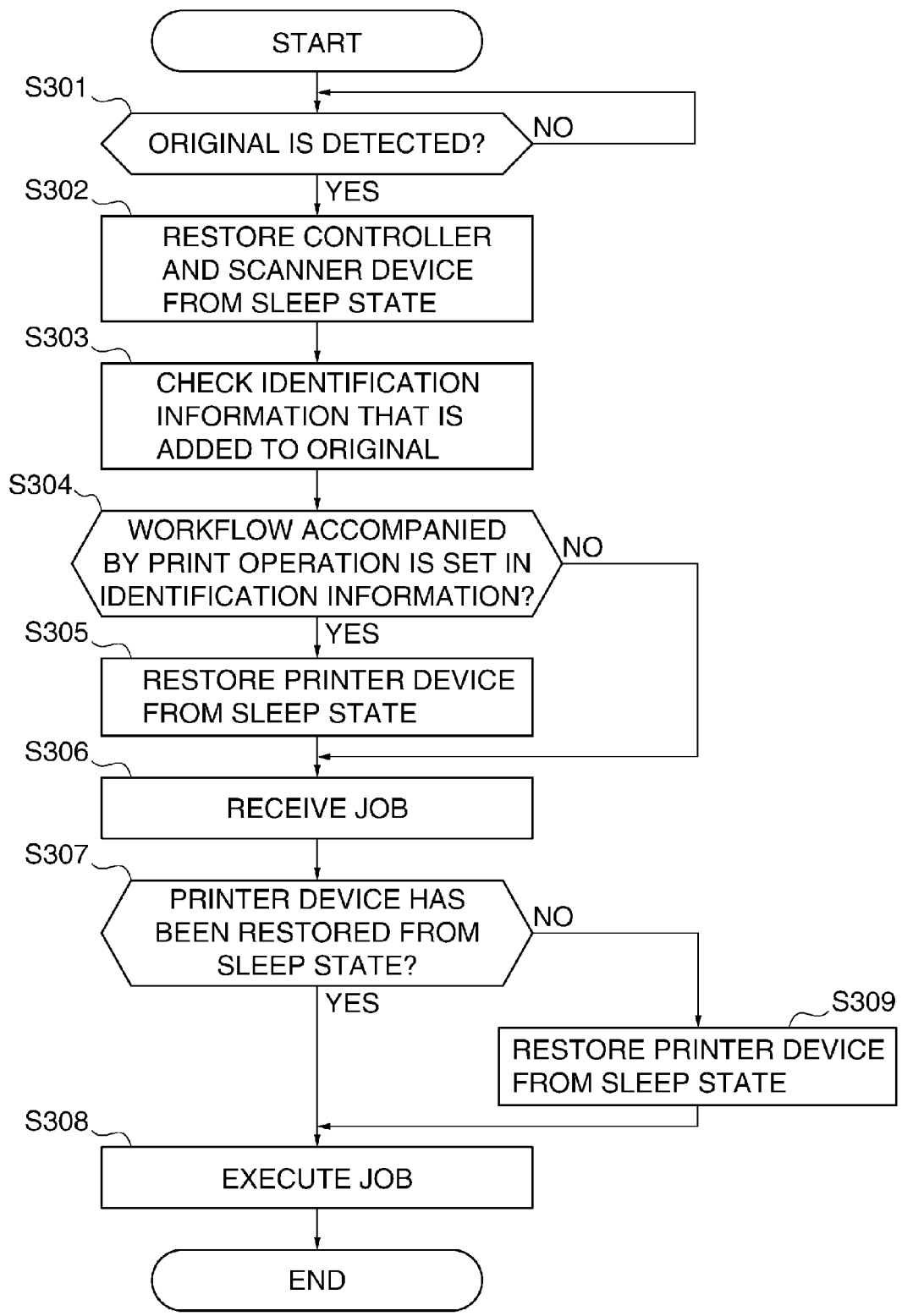
FIG. 3 is a flowchart showing a power control process of an image forming apparatus in a second embodiment of the present invention.

FIG. 3 is a flowchart showing a power control process of an image forming apparatus in the second embodiment of the present invention. This process is achieved because the CPU 13 reads a control program from the hard disk 14 and executes the control program. Moreover, the image forming apparatus 1 shall be in the sleep state at the starting time of this process.

When the scanner device 2 detects an original (YES in step S301), the CPU 13 receives an original detection signal transmitted from the scanner device 2, and performs a sleep restoration process for the controller 3 and the scanner device 2 (step S302). Although the sleep restoration process is performed when receiving the original detection signal from the scanner device 2 in this embodiment, the sleep restoration process may be performed in response to a depression of the sleep restoration button of the operation unit 8.

Next, the CPU 13 communicates with the scanner device 2, and checks identification information that is added to the detected original (step S303). The identification information describes what kind of workflow treats an original, and it is a two-dimensional bar code, for example. Next, the CPU 13 determines whether the workflow accompanied by a print operation is set in the identification information (step S304).

When determining that the workflow accompanied by a print operation is set in the identification information (YES in the step S304) based on the determination result of the step S304, the CPU 13 executes the sleep restoration process for the printer device 4 (step S305), and proceeds with the process to step S306. On the other hand, when determining that the workflow accompanied by a print operation is not set in the identification information (NO in the step S304), the CPU 13 proceeds with the process to the step S306 without executing the sleep restoration process for the printer device 4.

In the step S306, the CPU 13 receives an operation by an operator on the operation unit 8 or a job from the computer 10 via the LAN. Since the printer device 4 is needed to execute the received job, the CPU 13 determines whether the printer device 4 has been restored from the sleep state (step S307). When determining that the printer device 4 has not been restored from the sleep state (NO in the step S307), the CPU 13 executes the sleep restoration process for the printer unit 4 (step S309) and then, executes the received job (step S308). On the other hand, when determining that the printer device 4 has been restored from the sleep state (YES in the step S307), the CPU 13 proceeds with the process to the step S308 without executing the step S309.

In the above-mentioned embodiment, when an original is detected, the controller 3 and the scanner device 2 are restored from the sleep state first. Then, when the identification information added to the original concerned is analyzed and the workflow accompanied by a print operation is set in the identification information, the printer device 4 is further restored from the sleep state before receiving a job. This enables a quick response to a job when the received job needs the printer device 4. On the other hand, when the workflow accompanied by a print operation is not set in the identification information, the printer device 4 is restored from the sleep state after receiving a job. This shortens the power-on time of the printer device 4, and improves a power saving effect.

Moreover, the present invention may also be accomplished by executing the following process. It is a process that supplies a system or an apparatus with a storage medium in which software (a program) that achieves the functions of the above described embodiment is stored, and causes a computer (or CPU or MPU) of the system or apparatus to read out and execute the programs.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)*), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-117791, filed Jun. 4, 2013, which is hereby incorporated by reference herein in its entirety.

What is claimed is:

1. An image forming apparatus comprising:
   a reading unit configured to read an image of an original;
   a printing unit configured to print out image data;
   a control unit configured to control units including said reading unit and said printing unit;
   a detection unit configured to detect an original placed in said reading unit; and
   a power control unit configured to restore said control unit and said reading unit from a sleep state when said detection unit detects an original, and to further restore said printing unit from the sleep state before receiving a job when identification information added to the original concerned is analyzed and a workflow accompanied by a print operation is set in the identification information.

2. A control method for an image forming apparatus comprising:
   a detection step of detecting an original placed in a reading unit that reads an image of the original;
   a first restoration step of restoring a control unit that controls other units and the reading unit from a sleep state when an original is detected in said detection step;
   a determination step of determining whether a sheet of the same size as the original concerned is stored; and
   a second restoration step of restoring a printing unit, which prints image data, from the sleep state before receiving a job when it is determined that a sheet of the same size as the original concerned is stored in said determination step.

3. A control method for an image forming apparatus comprising:
   a detection step of detecting an original placed in a reading unit that reads an image of the original;
   a first restoration step of restoring a control unit that controls other units and the reading unit from a sleep state when an original is detected in said detection step;
   an analysis step of analyzing identification information added to the original concerned; and
   a second restoration step of restoring a printing unit, which prints image data, from the sleep state before receiving a job when it is determined that a workflow accompanied by a print operation is set in the identification information in said analysis step.

4. A non-transitory computer-readable storage medium storing a control program causing a computer to execute a control method for an image forming apparatus, the control method comprising:

a detection step of detecting an original placed in a reading unit that reads an image of the original;

a first restoration step of restoring a control unit that controls other units and the reading unit from a sleep state when an original is detected in said detection step;

a determination step of determining whether a sheet of the same size as the original concerned is stored; and a second restoration step of restoring a printing unit, which prints image data, from the sleep state before receiving a job when it is determined that a sheet of the same size as the original concerned is stored in said determination step.

5. A non-transitory computer-readable storage medium storing a control program causing a computer to execute a control method for an image forming apparatus, the control method comprising:

a detection step of detecting an original placed in a reading unit that reads an image of the original;

a first restoration step of restoring a control unit that controls other units and the reading unit from a sleep state when an original is detected in said detection step;

an analysis step of analyzing identification information added to the original concerned; and a second restoration step of restoring a printing unit, which prints image data, from the sleep state before receiving a job when it is determined that a workflow accompanied by a print operation is set in the identification information in said analysis step.

* * * * *